(No Model.)

W. T. MAKEPEACE.
AX.

No. 267,703. Patented Nov. 21, 1882.

Witnesses.
J. N. Piper
E. B. Pratt

Inventor.
Wm. T. Makepeace.
by R. H. Eddy, atty.

UNITED STATES PATENT OFFICE.

WILLIAM T. MAKEPEACE, OF MARSTON'S MILLS, MASSACHUSETTS.

AX.

SPECIFICATION forming part of Letters Patent No. 267,703, dated November 21, 1882.

Application filed August 26, 1882. (No model.)

*To all whom it may concern:*

Be it known that I, WILLIAM T. MAKEPEACE, of Marston's Mills, in the county of Barnstable, of the State of Massachusetts, have invented a new and useful Improvement in Axes; and I do hereby declare the same to be described in the following specification, and represented in the accompanying drawings, of which—

Figure 1:
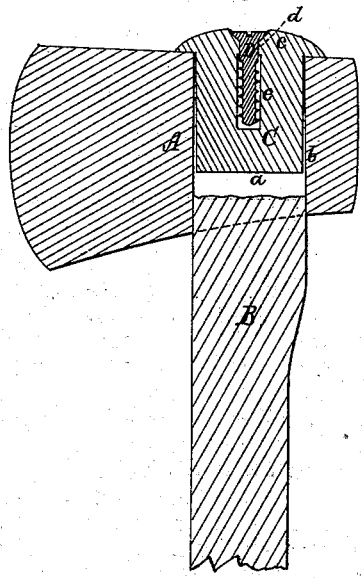
Figure 2:
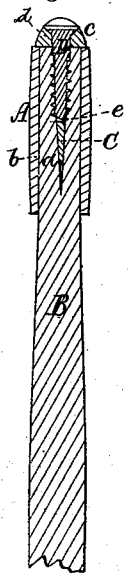
Figure 3:
Figure 4:
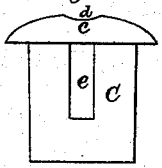
Figure 5:

Figure 1 is a longitudinal section, and Fig. 2 a transverse section, of an ax head or blade and a portion of its handle as provided with my invention, the nature of which is defined in the claim or claims hereinafter set forth. Fig. 3 is a top view, Fig. 4 a side elevation, and Fig. 5 an edge view, of the headed and slotted wedge used in the ax head or blade and its handle to aid in securing them together, such wedges and the screw employed therewith being also useful in holding together the heads and handles of various other implements—such as hammers or adzes, for instance.

In the drawings, A denotes the ax head or blade, and B the handle, or the upper part thereof, there being driven into that portion $a$ of the handle, which is within the eye $b$ of the blade a wedge, C, to spread such portion in order to cause it to tightly fit the eye. This wedge I construct with a head, $c$, having through it at its middle a countersunk hole, $d$, to open into a slot, $e$, made through and down within the wedge in manner as shown. The said slot does not continue from the head to and through the foot of the body of the wedge, but terminates at some distance from the foot, as in such case all danger of spreading the body of the wedge or cracking or bending it at and across the middle of its head while the wedge is being driven into or extracted from the handle is prevented. The hole in the wedge-head and the slot in the wedge-body are, with the handle, to receive a screw, D, whose thread has a diameter to cause it to project in opposite directions from the body of the wedge, and on entering the handle to screw into it, in order for the screw to hold the wedge in place in case of shrinkage of the handle. After the wedge may have been forced or driven into the handle and ax head or blade, the screw is to be inserted within the wedge and screwed down into the head of the handle.

I do not claim a wedge having a slot extending through it transversely and down through its foot or smaller end, and from a hole made downward within the wedge from its upper end; nor do I claim such a wedge inserted in an ax-handle, and held therein by a screw going down into the slot and extending beyond the foot thereof, all being as represented in the United States Patent No. 55,437.

What I claim as my invention is—

1. The wedge provided with the head and the screw-receiving hole arranged therein, and with a slot to extend through the wedge transversely and down from the head and terminating above the foot of the wedge, as set forth.

2. The combination of a tool or ax head and a handle extending into the eye thereof, with a headed wedge having a slot in it to extend from the head nearly down to the foot of such wedge, and with a screw inserted in the head and slot and screwed into the wood next adjacent to the slot, all being substantially as set forth.

WILLIAM T. MAKEPEACE.

Witnesses:
R. H. EDDY,
E. B. PRATT.